United States Patent
Sugawara et al.

(10) Patent No.: US 12,549,564 B2
(45) Date of Patent: Feb. 10, 2026

(54) COMMUNICATION SYSTEM AND RELAY DEVICE

(71) Applicants: TOYOTA JIDOSHA KABUSHIKI KAISHA, Toyota (JP); DENSO CORPORATION, Kariya (JP)

(72) Inventors: Shinnosuke Sugawara, Toyota (JP); Tokuya Inagaki, Kariya (JP); Shogo Watanabe, Kariya (JP); Ryosuke Murakami, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 235 days.

(21) Appl. No.: 18/379,750

(22) Filed: Oct. 13, 2023

(65) Prior Publication Data
US 2024/0179179 A1    May 30, 2024

(30) Foreign Application Priority Data
Nov. 30, 2022    (JP) .................... 2022-191360

(51) Int. Cl.
*H04L 9/40*    (2022.01)
*H04L 67/12*    (2022.01)

(52) U.S. Cl.
CPC .......... *H04L 63/126* (2013.01); *H04L 63/162* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2016/0021127 A1* | 1/2016 | Yan ................. | H04W 12/08 726/23 |
| 2017/0305368 A1* | 10/2017 | Markham ........... | B60R 16/0231 |
| 2018/0254903 A1* | 9/2018 | Bardelski ............ | G06F 21/72 |
| 2021/0075825 A1* | 3/2021 | Davis ................. | H04L 63/1416 |
| 2022/0303287 A1* | 9/2022 | Sloan .................. | H04L 43/022 |

FOREIGN PATENT DOCUMENTS

| | | | | |
|---|---|---|---|---|
| JP | 2016-096375 A | | 5/2016 | |
| JP | 2018007204 A | * | 1/2018 | ............ H04L 9/32 |
| KR | 20180110280 A | * | 10/2018 | ............ H04W 4/80 |

OTHER PUBLICATIONS

Chah et al., "Privacy Threat Analysis for connected and autonomous vehicles", The 13th International Conference on Emerging Ubiquitous Systems and Pervasive Networks (EUSPN 2022), Oct. 26-28, 2022, Leuven, Belgium (Year: 2022).*

* cited by examiner

*Primary Examiner* — Amelia Vorce
(74) *Attorney, Agent, or Firm* — Oliff PLC

(57) ABSTRACT

A communication system includes a relay device and a diagnosis target device. The relay device includes a port configured to connect a diagnostic tool. The diagnosis target device is connected to the relay device via a bus. The relay device determines whether a communication path of diagnostic data for diagnosing the diagnosis target device is correct when the relay deice has received the diagnostic data, the diagnostic data being data that is transferred between the relay device and the diagnostic tool. The relay device sends to the diagnosis target device a monitoring result including a determination result as to whether the communication path of the diagnostic data is correct.

10 Claims, 5 Drawing Sheets

COMMUNICATION SYSTEM AND RELAY DEVICE

CROSS-REFERENCE TO RELATED APPLICATION

This application claims priority to Japanese Patent Application No. 2022-191360 filed on Nov. 30, 2022, incorporated herein by reference in its entirety.

BACKGROUND

1. Technical Field

The present disclosure relates to communication systems and relay devices.

2. Description of Related Art

Japanese Unexamined Patent Application Publication No. 2016-096375 (JP 2016-096375 A) describes a communication system. The communication system includes a bus connecting a plurality of devices. Each device uses a common key and a message authentication code for data that is transferred via the bus in order to prevent an unauthorized access due to data falsification and spoofing.

In such a communication system as described in JP 2016-096375 A, a diagnostic tool is sometimes connected to a relay device that relays data. Connecting the diagnostic tool in this manner allows various types of data etc. related to diagnosis to be transferred between the diagnostic tool and each device connected to the bus. However, such a function may be abused, and illegal data pretending to be data from the diagnostic tool may be input to each device via the bus. Such an unauthorized access prevention technique using a common key and a message authentication code as described in JP 2016-096375 A can prevent such transfer of illegal data. However, the technique using a common key and a message authentication code increases the processing load on each device. Therefore, apart from the technique using a common key and a message authentication code, there is a demand for an unauthorized access prevention technique with a lower processing load.

SUMMARY

According to one aspect of the present disclosure, a communication system includes: a relay device including a port configured to connect a diagnostic tool; and a diagnosis target device connected to the relay device via a bus. The relay device is configured to: determine whether a communication path of diagnostic data for diagnosing the diagnosis target device is correct when the relay deice has received the diagnostic data, the diagnostic data being data that is transferred between the relay device and the diagnostic tool; and send to the diagnosis target device a monitoring result including a determination result as to whether the communication path of the diagnostic data is correct.

According to another aspect of the present disclosure, a relay device includes a port configured to connect a diagnostic tool. The relay device is configured to: determine whether a communication path of diagnostic data for diagnosing a diagnosis target device is correct when the relay device has received the diagnostic data, the diagnostic data being data that is transferred between the relay device and the diagnostic tool; and send to outside via a communication bus different from the port a monitoring result including a determination result as to whether the communication path of the diagnostic data is correct.

According to the above configuration, when the relay device has received the diagnostic data, the relay device determines whether the communication path of the received diagnostic data is correct. The relay device then repeatedly sends the monitoring result including the determination result to the diagnosis target device. The relay device can thus determine whether an unauthorized access has been made. The diagnosis target device can also be aware of the unauthorized access based on the monitoring result received from the relay device. This configuration can reduce an unnecessary increase in processing load on the diagnosis target device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiment

An embodiment of a communication system will be described below with reference to the drawings. The following description illustrates a vehicle equipped with the communication system.

Overview of Communication System

Figure 1:
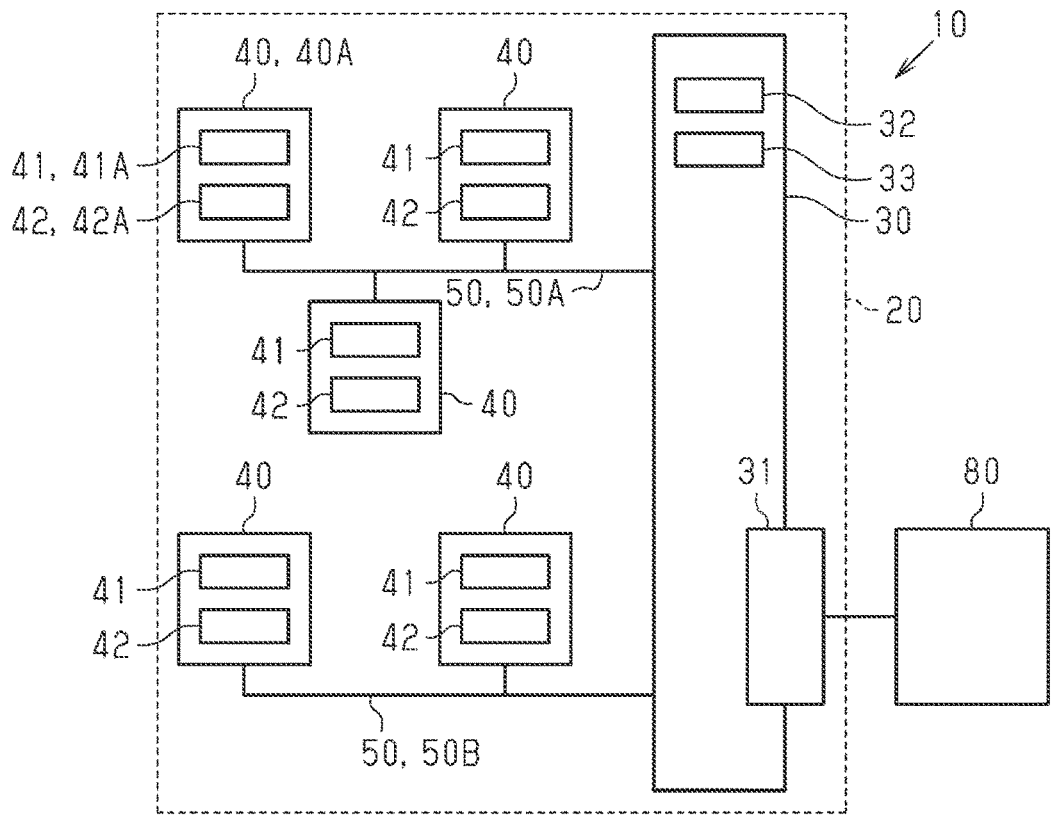
FIG. 1 is a schematic diagram of a communication system according to an embodiment.

As shown in FIG. 1, a vehicle 10 includes a communication system 20. The communication system 20 includes a relay device 30 and a plurality of control devices 40. The relay device 30 and each control device 40 are connected via a communication bus 50.

In the present embodiment, three control devices 40 are connected to the relay device 30 via a first bus 50A. Two control devices 40 are connected to the relay device 30 via a second bus 50B.

The control devices 40 control actuators mounted on the vehicle 10. Each control device 40 includes an execution unit 41 and a storage unit 42. The execution unit 41 is a central processing unit (CPU). The storage unit 42 is a read-only memory (ROM) and a random access memory (RAM). The storage unit 42 stores parameters indicating the communication state of the control device 40. The communication state indicates a locked state or an unlocked state.

The locked state is a state in which communication of diagnostic data DD is disabled. The diagnostic data DD is data for diagnosing a device to be diagnosed and is transferred between the control device 40 and the diagnostic tool 80. The unlocked state is a state in which the locked state is cancelled, that is, a state in which various types of communication including communication of the diagnostic data DD are enabled. The storage unit 42 stores various programs. The execution unit 41 can execute the various programs stored in the storage unit 42. The execution unit 41 implements the following control functions for the actuator by executing these programs.

For example, one of the control devices 40 controls an engine of the vehicle 10. For example, one of the control devices 40 controls a brake of the vehicle 10. For example, one of the control devices 40 controls a steering system of the vehicle 10. For example, one of the control devices 40 controls locking and unlocking of a door of the vehicle 10.

The relay device 30 relays data that is received and sent through each bus 50. For example, it is assumed that data is sent from the control device 40 connected to the first bus 50A to the control device 40 connected to the second bus 50B. In this case, the relay device 30 receives the data via the first bus 50A and sends the received data via the second bus 50B. The relay device 30 includes a port 31 for connecting a diagnostic tool 80. Signals from the diagnostic tool 80 are input to the port 31. Signals for the diagnostic tool 80 are sent from the port 31. The diagnostic tool 80 is a tool for diagnosing at least one of the control devices 40 at, for example, a repair shop such as a dealership.

The relay device 30 includes an execution unit 32 and a storage unit 33. The execution unit 32 is a CPU. The storage unit 33 is a ROM and a RAM. The storage unit 33 stores various programs. The execution unit 32 can execute the various programs stored in the storage unit 33. The execution unit 32 implements the following communication functions by executing these programs.

The relay device 30 can receive a message sent according to a first communication standard from the diagnostic tool 80 via the port 31. The relay device 30 can convert the protocol of the received message according to the first communication standard to a second communication standard and send the resultant message to the destination control device 40 via the bus 50. That is, the relay device 30 functions as a so-called gateway.

The relay device 30 also receives a message according to the second communication standard from the control device 40 via the bus 50. The relay device 30 can convert the protocol of the received message according to the second communication standard to the first communication standard and send the resultant message to the diagnostic tool 80 from the port 31.

It is herein assumed that one of the control devices 40 that is to be diagnosed by the diagnostic tool 80 is a diagnosis target device 40A. The diagnosis target device 40A can therefore be connected to the relay device 30 via the bus 50. Messages containing the diagnostic data DD are transferred between the diagnostic tool 80 and the diagnosis target device 40A. Specifically, when conducting a diagnosis using the diagnostic tool 80, the diagnostic tool 80 sends a message containing request data RQ out of the diagnostic data DD to the port 31. The source of the request data RQ is therefore the diagnostic tool 80. Since the request data RQ is sent to the diagnosis target device 40A, the request data RQ is an example of the specific data.

When the relay device 30 receives the request data RQ, the relay device 30 sends the received message containing the request data RQ to the diagnosis target device 40A external to the relay device 30 via the bus 50. When the diagnosis target device 40A receives the request data RQ, the diagnosis target device 40A outputs response data RP in response to the request data RQ. The diagnosis target device 40A sends a message containing the response data RP to the relay device 30 via the bus 50. The relay device 30 sends the received message containing the response data RP from the port 31 to the diagnostic tool 80. The diagnostic tool 80 diagnoses the diagnosis target device 40A based on the response data RP. The destination of the response data RP is therefore the diagnostic tool 80.

As used herein, the "diagnostic data DD" refers to data contained in a message and containing information identifying the diagnostic tool 80 as a source or destination. Therefore, the "diagnostic data DD" includes not only data whose source is actually the diagnostic tool 80 but also data pretending to be data whose source is the diagnostic tool 80. The "diagnostic data DD" also includes not only data actually sent to the diagnostic tool 80 but also data sent to a device pretending to be the diagnostic tool 80.

Series of Steps Related to Monitoring of Relay Device

Next, a series of steps related to monitoring of the relay device 30 will be described. The storage unit 33 stores a monitoring result transmission program for sending a monitoring result MR. The storage unit 33 also stores the following two programs as programs for determining a communication path of the diagnostic data DD: a request data determination program and a response data determination program. The request data determination program is a program for determining the communication path of the diagnostic data DD based on the request data RQ. The response data determination program is a program for determining the communication path of the diagnostic data DD based on the response data RP sent in response to the request data RQ. The execution unit 32 executes the monitoring result transmission program when the execution unit 32 has received some sort of data.

Figure 2:
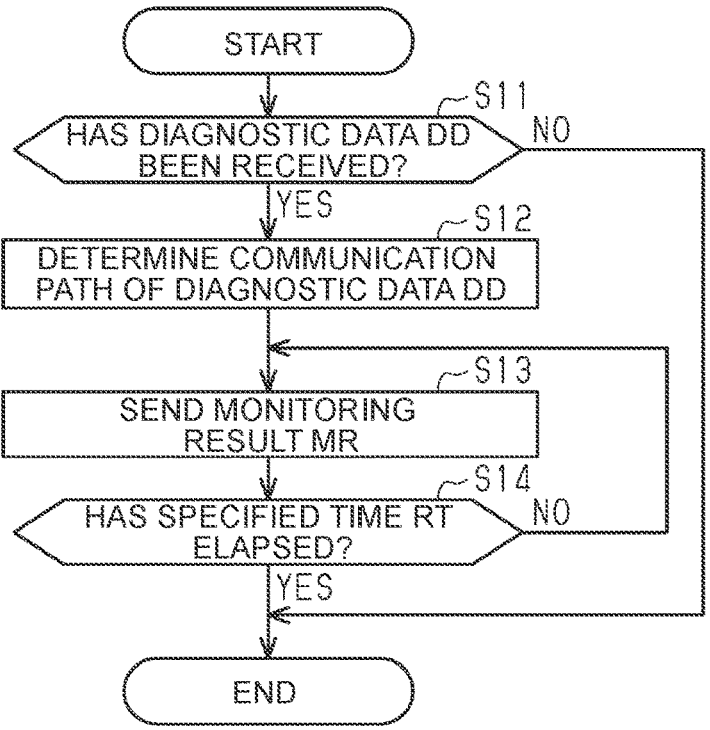
FIG. 2 is a flowchart of a series of steps related to monitoring of a relay device.

As shown in FIG. 2, when the execution unit 32 has started executing the monitoring result transmission program, the execution unit 32 first performs step S11. In step S11, the execution unit 32 determines whether the received data is diagnostic data DD. That is, the execution unit 32 determines whether it has received diagnostic data DD. Whether the received data is diagnostic data DD can be determined based on the source and destination of the received data. When the data received by the execution unit 32 is not diagnostic data DD (S11: NO), the execution unit 32 ends the current series of steps. On the other hand, when the execution unit 32 has received diagnostic data DD (S11: YES), the process proceeds to step S12.

In step S12, the execution unit 32 determines whether the communication path of the received diagnostic data DD is correct. Specifically, the execution unit 32 executes the request data determination program and the response data determination program that are stored in the storage unit 33. Processing by each program will be described later. The execution unit 32 thus acquires the determination result JR indicating whether the communication path of the diagnostic data DD is correct. The process then proceeds to step S13.

In step S13, the execution unit 32 sends the monitoring result MR including the determination result JR acquired in step S12 to all the control devices 40 to be diagnosed that are connected to the relay device 30 via the same bus 50 as the diagnosis target device 40A. The process then proceeds to step S14.

In step S14, the execution unit 32 determines whether a predetermined specified time RT has elapsed since step S12 was started. When the specified time RT has not elapsed (S14: NO), the process returns step S13. That is, the execution unit 32 repeatedly sends the monitoring result MR until the specified time RT elapses. When the specified time RT has elapsed (S14: YES), the execution unit 32 ends the current series of steps.

Monitoring of Request Data

Figure 3:
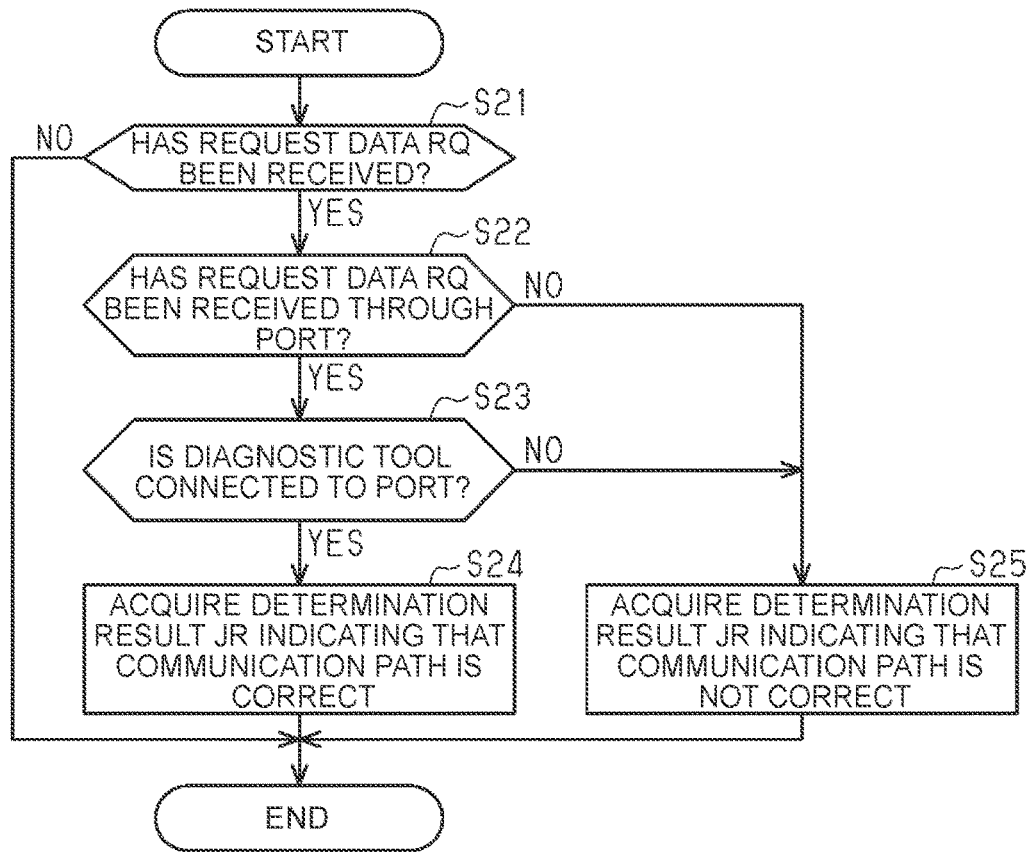
FIG. 3 is a flowchart of a process of monitoring request data by the relay device.

As shown in FIG. 3, when the execution unit 32 has started executing the request data determination program, the execution unit 32 first performs step S21. In step S21, the execution unit 32 determines whether it has received request data RQ out of the diagnostic data DD. When the received diagnostic data DD is not request data RQ (S21: NO), the execution unit 32 ends the current series of steps. On the other hand, when the received diagnostic data DD is request data RQ (S21: YES), the process proceeds to step S22.

In step S22, the execution unit 32 determines whether it has received the request data RQ through the port 31. Specifically, the execution unit 32 determines whether it has received the request data RQ through the port 31 or through the bus 50. When the execution unit 32 has received the request data RQ through the bus 50, the execution unit 32 determines that it has not received the request data RQ through the port 31. When the execution unit 32 has received the request data RQ through the port 31 (S22: YES), the process proceeds to step S23.

In step S23, the execution unit 32 determines whether the diagnostic tool 80 is connected to the port 31. When the diagnostic tool 80 is connected to the port 31 (S23: YES), the process proceeds to step S24.

In step S24, the execution unit 32 determines that the communication path of the received request data RQ is correct. The execution unit 32 then acquires the determination result JR indicating that the communication path of the diagnostic data DD is correct. Thereafter, the execution unit 32 ends the series of steps.

On the other hand, when the execution unit 32 has not received the request data RQ through the port 31 (S22: NO), that is, when the execution unit 32 has received the request data RQ through the bus 50, the process proceeds to step S25. When the diagnostic tool 80 is not connected to the port 31 (S23: NO), the process proceeds to step S25.

In step S25, the execution unit 32 determines that the communication path of the received request data RQ is not correct. The execution unit 32 then acquires the determination result JR indicating that the communication path of the diagnostic data DD is not correct. Thereafter, the execution unit 32 ends the series of steps.

Monitoring of Response Data

Figure 4:
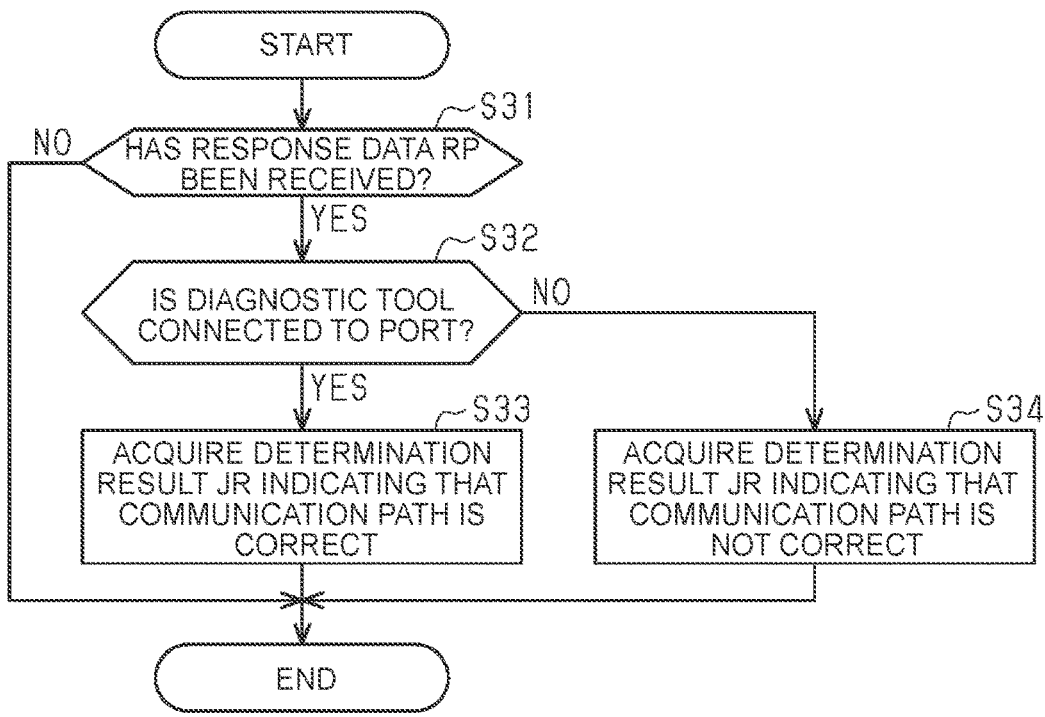
FIG. 4 is a flowchart of a process of monitoring response data by the relay device.

As shown in FIG. 4, when the execution unit 32 has started executing the response data determination program, the execution unit 32 first performs step S31. In step S31, the execution unit 32 determines whether it has received response data RP out of the diagnostic data DD. When the execution unit 32 has not received response data RP (S31: NO), the execution unit 32 ends the current series of steps. On the other hand, when the execution unit 32 has received response data RP (S31: YES), the process proceeds to step S32.

In step S32, the execution unit 32 determines whether the diagnostic tool 80 is connected to the port 31. When the diagnostic tool 80 is connected to the port 31 (S32: YES), the process proceeds to step S33.

In step S33, the execution unit 32 determines that the communication path of the received response data RP is correct. The execution unit 32 then acquires the determination result JR indicating that the communication path of the diagnostic data DD is correct. Thereafter, the execution unit 32 ends the series of steps.

When the diagnostic tool 80 is not connected to the port 31 (S32: NO), the process proceeds to step S34. In step S34, the execution unit 32 determines that the communication path of the received response data RP is not correct. The execution unit 32 then acquires the determination result JR indicating that the communication path of the diagnostic data DD is not correct. Thereafter, the execution unit 32 ends the series of steps.

Locked State of Diagnosis Target Device

A storage unit 42A of the diagnosis target device 40A stores a communication lock program for changing the communication state of the diagnosis target device 40A to the locked state. An execution unit 41A of the diagnosis target device 40A executes this program every time the execution unit 41A receives the monitoring result MR. The execution unit 41 of the diagnosis target device 40A is referred to as "execution unit 41A," and the storage unit 42 of the diagnosis target device 40A is referred to as "storage unit 42A."

Figure 5:
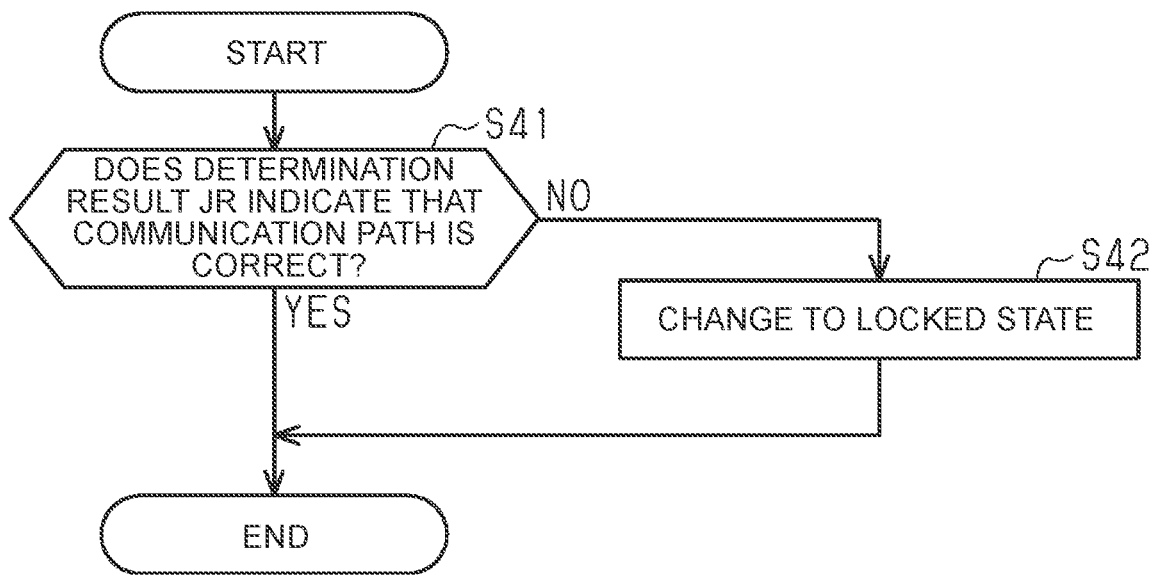
FIG. 5 is a flowchart of a process related to a locked state of a diagnosis target device.

As shown in FIG. 5, when the execution unit 41A has started executing the communication lock program, the execution unit 41A first performs step S41. In step S41, the execution unit 41A determines whether the determination result JR included in the received monitoring result MR indicates that the communication path of the diagnostic data DD is correct.

When the received determination result JR indicates that the communication path is correct (S41: YES), the execution unit 41A ends the current series of steps. In this case, the execution unit 41A performs communication of the diagnostic data DD etc. as usual. On the other hand, when the received determination result JR indicates that the communication path is not correct (S41: NO), the process proceeds to step S42.

In step S42, the execution unit 41A changes the communication state of the diagnosis target device 40A to the locked state in which communication of the diagnostic data DD is disabled. Specifically, the execution unit 41A changes the parameter stored in the storage unit 42A and indicating the communication state to the parameter indicating the locked state. As a result, the diagnosis target device 40A changes to the state in which the diagnosis target device 40A is unable to receive the diagnostic data DD, that is, the data whose source or destination is the diagnostic tool 80. The execution unit 41A then ends the current series of steps.

Connection of Diagnostic Tool

The storage unit 33 stores a tool connection monitoring program for monitoring the connection state of the diagnostic tool 80 to the port 31. The execution unit 32 sends the monitoring result MR including the determination result JR indicating that the communication path of the diagnostic data DD is not correct by executing the monitoring result transmission program. The execution unit 32 then repeatedly executes the tool connection monitoring program at a predetermined cycle during a predetermined period after sending the monitoring result MR.

Figure 6:
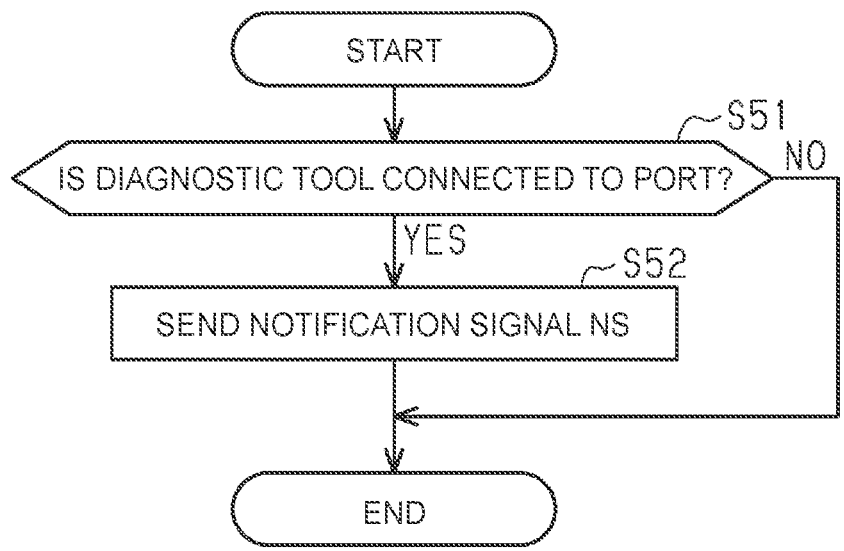
FIG. 6 is a flowchart of a process related to a notification signal by the relay device.

As shown in FIG. 6, when the execution unit 32 has started executing the tool connection monitoring program, the execution unit 32 first performs step S51. In step S51, the execution unit 32 determines whether the diagnostic tool 80 is connected to the port 31. When the diagnostic tool 80 is not connected to the port 31 (S51: NO), the execution unit 32 ends the current series of steps.

When the diagnostic tool 80 is connected to the port 31 (S51: YES), the process proceeds to step S52. In step S52, the execution unit 32 sends to the diagnosis target device 40A a notification signal NS indicating that the diagnostic tool 80 is connected to the port 31. The execution unit 32 then ends the current series of steps.

Change to Unlocked State

The storage unit 42A stores an unlock program for cancelling the locked state of the diagnosis target device 40A. The execution unit 41A executes the unlock program in response to the notification signal NS.

Figure 7:
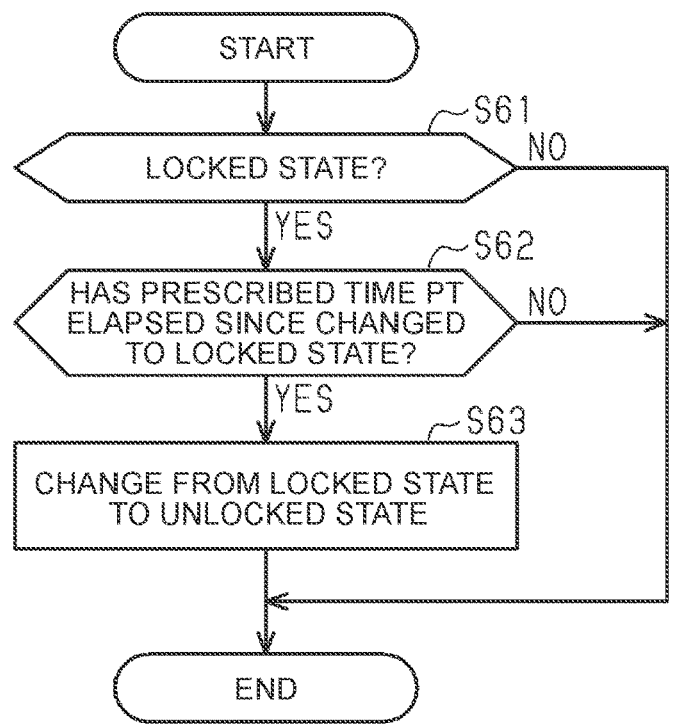
FIG. 7 is a flowchart of a process related to an unlocked state of the diagnosis target device.

As shown in FIG. 7, when the execution unit 41A has started executing the unlock program, the execution unit 41A first performs step S61. In step S61, the execution unit 41A determines whether the communication state of the diagnosis target device 40A is the locked state. The execution unit 41A determines the communication state by referring to the parameter stored in the storage unit 42A and indicating the communication state. When the communication state of the diagnosis target device 40A is not the locked state (S61: NO), the execution unit 41A ends the current series of steps. On the other hand, when the communication state of the diagnosis target device 40A is the locked state (S61: YES), the process proceeds to step S62.

In step S62, the execution unit 41A determines whether a predetermined prescribed time PT has elapsed since the communication state of the diagnosis target device 40A was changed to the locked state. When the prescribed time PT has not elapsed (S62: NO), the execution unit 41A ends the current series of steps. On the other hand, when the prescribed time PT has elapsed (S62: YES), the process proceeds to step S63.

In step S63, the execution unit 41A changes the communication state of the diagnosis target device 40A from the locked state to the unlocked state. Specifically, the execution unit 41A changes the parameter stored in the storage unit 42A and indicating the communication state from the parameter indicating the locked state to the parameter indicating the unlocked state. When the communication state is the unlocked state, the diagnosis target device 40A is able to receive diagnostic data DD. The execution unit 41A then ends the series of steps.

Operations of Embodiment

In the communication system 20 of the above embodiment, request data RQ out of diagnostic data DD is normally sent from the diagnostic tool 80 to the diagnosis target device 40A via the relay device 30. In response to the request data RQ, response data RP out of the diagnostic data DD is sent from the diagnosis target device 40A to the diagnostic tool 80 via the relay device 30. In case of an unauthorized access, however, request data RQ is sent to the relay device 30 via the bus 50, or response data RP is sent to the relay device 30 while the diagnostic tool 80 is not connected to the port 31.

Figure 8:
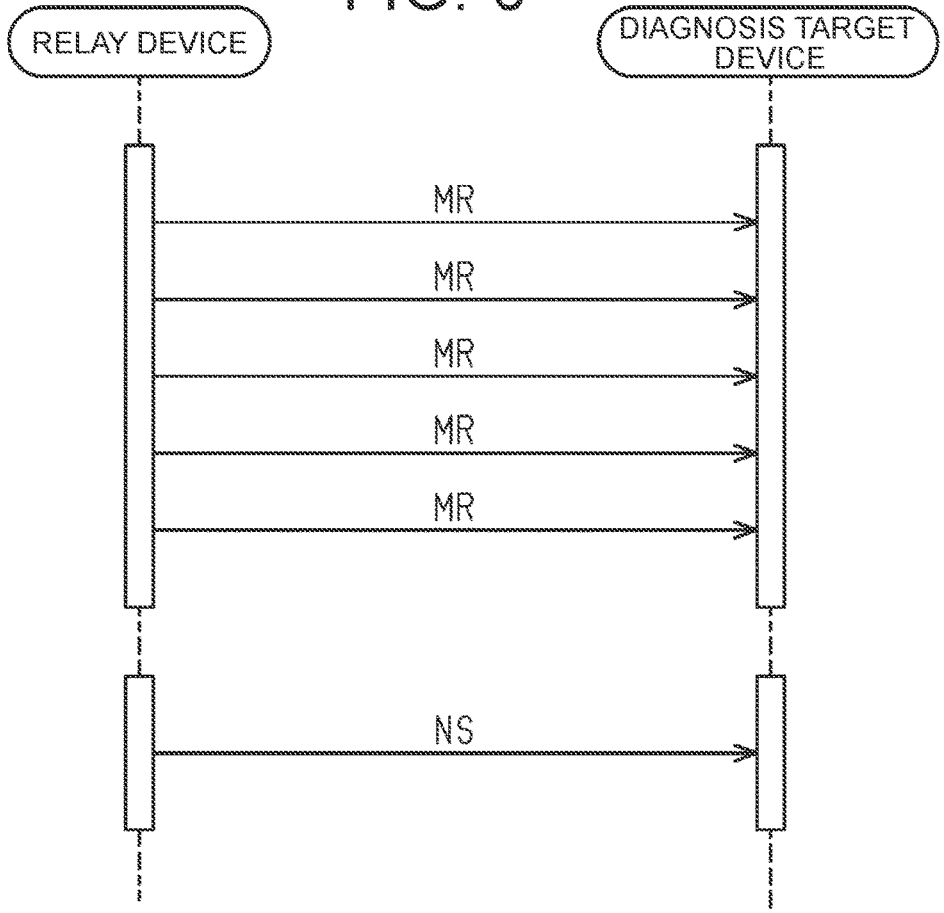
FIG. 8 is a sequence chart illustrating transmission and reception of signals in a communication system.

As shown in FIG. 8, in the communication system 20 of the above embodiment, when the relay device 30 receives diagnostic data DD via the port 31 or the bus 50, the relay device 30 determines whether the communication path of the received diagnostic data DD is correct. The relay device 30 repeatedly sends the monitoring result MR including the determination result JR to the diagnosis target device 40A.

The diagnosis target device 40A that has received the monitoring result MR changes its communication state to the locked state when the determination result JR included in the monitoring result MR indicates that the communication path of the diagnostic data DD is not correct.

The relay device 30 also monitors connection of the diagnostic tool 80 to the port 31 after sending the monitoring result MR including the determination result JR indicating that the communication path of the diagnostic data DD is not correct. When the diagnostic tool 80 is connected to the port 31, the relay device 30 sends a notification signal NS to the diagnosis target device 40A. In response to the notification signal NS, the diagnosis target device 40A changes its communication state from the locked state to the unlocked state.

Effects of Embodiment (1) According to the above embodiment, when the relay device 30 has received diagnostic data DD, the relay device 30 determines whether the communication path of the received diagnostic data DD is correct. The relay device 30 repeatedly sends the monitoring result MR including the determination result JR to the diagnosis target device 40A. Accordingly, whether an unauthorized access has been attempted can be determined by the relay device 30 that can determine whether the communication path is correct. The diagnosis target device 40A can also be aware of the unauthorized access based on the monitoring result MR received from the relay device 30. This configuration can reduce an unnecessary increase in processing load on the diagnosis target device 40A.

(2) According to the above embodiment, the relay device 30 normally receives request data RQ as the specific data whose source is the diagnostic tool 80 via the port 31. Therefore, when request data RQ whose source is the diagnostic tool 80 is received via the bus 50, this request data RQ is very likely to be illegal data with a false source. In this regard, in the above embodiment, the relay device 30 determines that the communication path of the request data RQ is not correct on condition that the request data RQ has been received via the bus 50. Therefore, according to the above embodiment, whether the communication path of the diagnostic data DD received by the diagnosis target device 40A is correct can be accurately determined.

(3) The relay device 30 normally receives request data RQ whose source is the diagnostic tool 80 via the port 31. Therefore, when request data RQ whose source is the diagnostic tool 80 is received via the bus 50, this request data RQ is very likely to be illegal data with a false source. In this regard, in the above embodiment, the relay device 30 determines that the communication path of the request data RQ is correct on condition that the diagnostic tool 80 is connected to the port 31. Therefore, according to the above embodiment, whether the communication path of the request data RQ received by the diagnosis target device 40A is a correct path whose source is the diagnostic tool 80 can be accurately determined.

(4) The diagnostic tool 80 never sends response data RP. The relay device 30 receives genuine response data RP from the diagnosis target device 40A via the bus 50. It is therefore inappropriate to determine that the communication path of the response data RP is not correct only on condition that the response data RP has been received via the bus 50. In this regard, according to the above embodiment, when the relay device 30 has received response data RP via the bus 50, the relay device 30 determines that the communication path of the response data RP is not correct on condition that the diagnostic tool 80 is not connected to the port 31. In other words, the relay device 30 determines that the communication path of the response data RP is not correct unless the situation is such that the response data RP is sent in response to the request data RQ. The relay device 30 can thus determine the communication path of the diagnostic data DD based on the response data RP.

(5) According to the above embodiment, the relay device 30 repeatedly sends the monitoring result MR including the determination result JR indicating that the communication path of the received diagnostic data DD is not correct to the diagnosis target device 40A during the specified time RT. When an unauthorized access is made, there is a possibility that the relay device 30 may become temporarily unable to send messages to the diagnosis target device 40A. Therefore, in the above embodiment, repeatedly sending the monitoring result MR can increase the possibility that the monitoring result MR will reach the diagnosis target device 40A even if the diagnosis target device 40A is temporarily unable to send messages.

(6) According to the above embodiment, the diagnosis target device 40A changes its communication state to the locked state on condition that the diagnosis target device 40A has received a monitoring result MR including the determination result JR indicating that the communication path of the diagnostic data DD is not correct. In the locked state, the diagnosis target device 40A is unable to communicate diagnostic data DD. This also makes communication of illegal spoofed data impossible. As a result, the diagnosis target device 40A can be prevented from sending and receiving illegal data.

(7) According to the above embodiment, the diagnosis target device 40A changes its communication state to the unlocked state on condition that the prescribed time PT has elapsed since the communication state of the diagnosis target device 40A was changed to the locked state. Even if a malicious person attempts an unauthorized access to the diagnosis target device 40A, he or she is very likely to give up quickly if the unauthorized access fails. In other words, it is unlikely that a malicious person will attempt an unauthorized access over a long period of time. Therefore, as in the above embodiment, after the prescribed time PT has elapsed, problems are less likely to occur even if the communication state of the diagnosis target device 40A is changed to the unlocked state. As the elapse of the prescribed time PT since the communication state of the diagnosis target device 40A was changed to the locked state is used as a criterion for determination, the processing load on the diagnosis target device 40A is minimized.

(8) In the above embodiment, the diagnosis target device 40A changes its communication state to the unlocked state on conditions that the diagnosis target device 40A has received a notification signal NS while its communication state is the locked state and that the prescribed time PT has elapsed since the communication state was changed to the locked state. According to this configuration, the communication state of the diagnosis target device 40A is changed to the unlocked state when the diagnostic tool 80 is connected to the port 31, that is, when it is probable that genuine diagnostic data DD will be received. Therefore, when the diagnostic tool 80 is connected in order to legally send and receive data, a situation in which data is unable to be sent and received is less likely to occur.

(9) According to the above embodiment, the relay device 30 sends a monitoring result MR to all the control devices 40 to be diagnosed that are connected to the relay device 30 via the same bus 50 as the diagnosis target device 40A. It is herein assumed that the diagnosis target device 40A is a first diagnosis target device and another control device 40 connected to the first bus 50A is a second diagnosis target device. When the first diagnosis target device receives illegal data via the first bus 50A, the second diagnosis target device may also receive illegal data via the first bus 50A. In this regard, according to the above embodiment, the relay device 30 also sends the monitoring result MR to the second diagnosis target device. Therefore, when the communication path of diagnostic data DD is not correct, the second diagnosis target device can also be aware of it.

OTHER EMBODIMENTS

The above embodiment can be modified as follows. The above embodiment and the following modifications may be combined as long as no technical contradiction arises.

Overall

The above embodiment illustrates an example in which the request data RQ is the specific data whose source is the diagnostic tool 80. However, the specific data is not limited to the request data RQ. The specific data can be any data whose source is the diagnostic tool 80. For example, the specific data may be data indicating a diagnostic result for the response data RP. Alternatively, the specific data may be data indicating that a diagnosis by the diagnostic tool 80 is going to be started. That is, the specific data is not limited to the data requesting the response data RP.

The diagnostic data DD is not limited to the request data RQ and the response data RP. The diagnostic data DD includes the specific data described above. The specific data can be any data whose source or destination is the diagnostic tool 80.

The monitoring result MR need only include at least the determination result JR. For example, the monitoring result MR may be a message containing both the determination result JR indicating whether the communication path of the diagnostic data DD is correct and data requesting the communication state of the diagnosis target device 40A to be the locked state.

Figure 9:
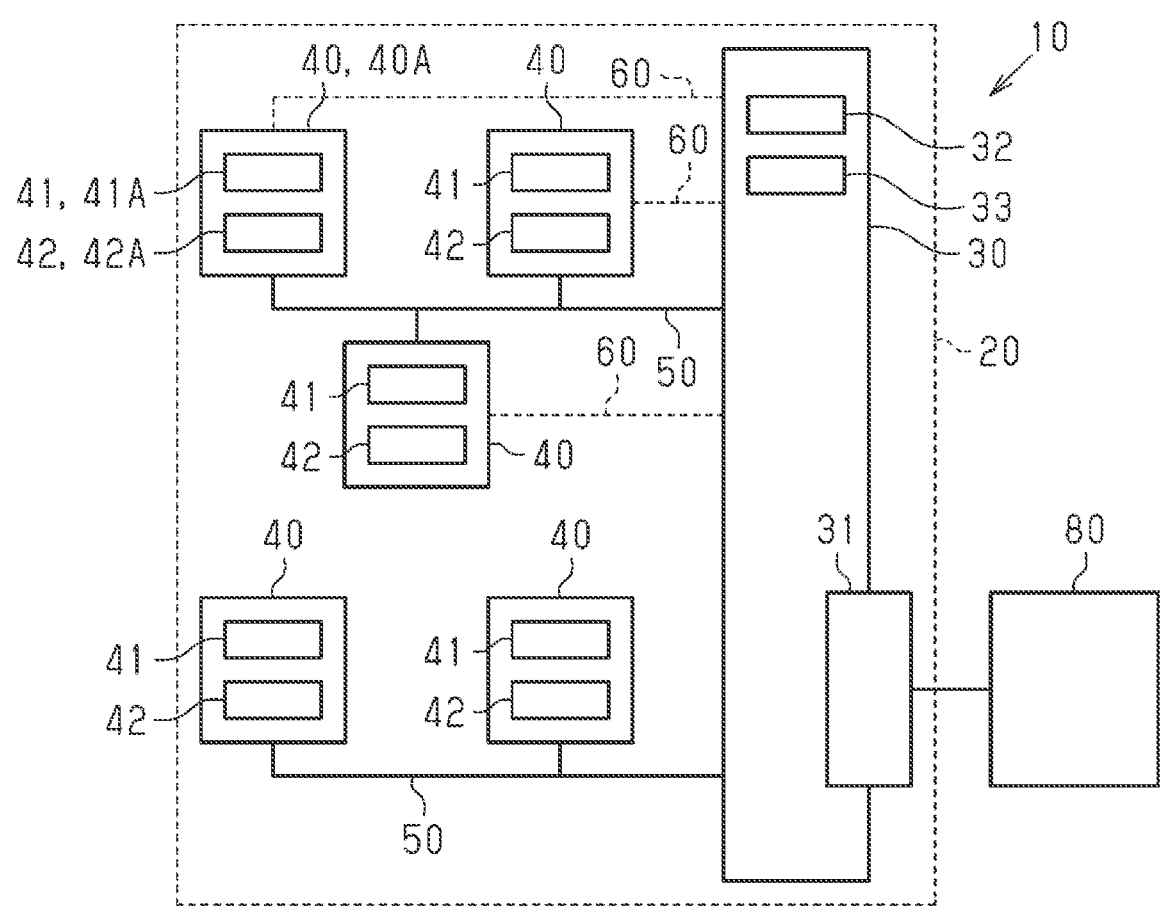
FIG. 9 is a schematic diagram of a communication system according to a modification.

When in the locked state, the diagnosis target device 40A may not receive any data, including the diagnostic data DD, via the bus 50. In this case, for example, as in the example shown in FIG. 9, the diagnosis target device 40A need only be connected to the relay device 30 via another bus 60 in addition to via the first bus 50A. The relay device 30 may send the monitoring result MR via the bus 60. According to this configuration, the relay device 30 sends the monitoring result MR via the bus 60 different from the first bus 50A that may receive illegal data. Therefore, even if the diagnosis target device 40A is controlled not to receive data via the first bus 50A, the diagnosis target device 40A can send the monitoring result MR.

The diagnostic tool 80 can be any so-called diagnostic tool. In the diagnosis using the diagnostic tool 80, the response data RP received from the diagnosis target device 40A may merely be acquired. In the diagnosis using the diagnostic tool 80, data indicating the result of control performed in response to the request data RQ may be received as the response data RP, and some sort of a determination process may be performed based on the response data RP. In other words, any diagnostic process may be performed in the diagnosis using the diagnostic tool 80.

The communication system 20 of the above embodiment may also use such a message authentication code as described in JP 2016-096375 A. This can further reduce unauthorized accesses.

Relay Device

The relay device 30 may be configured as circuitry including one or more processors that perform various processes according to computer programs (software). The relay device 30 may be configured as circuitry including either one or more dedicated hardware circuits, such as an application-specific integrated circuit (ASIC), that perform at least part of the various processes, or a combination thereof. The processor includes a CPU and a memory such as RAM and ROM. The memory stores program codes or commands configured to cause the CPU to perform processes. The memory, that is, a computer-readable medium, includes any available media that can be accessed by a general purpose or special purpose computer. The same applies to the control devices 40.

The relay device 30 may not send the notification signal NS. In this case, the diagnosis target device 40A can change its communication state to the unlocked state without relying on reception of the notification signal NS. In the above embodiment, the relay device 30 determines that the communication path of the request data RQ is not correct when the relay device 30 has received the request data RQ via the bus 50. However, the relay device 30 may determine that the communication path of the request data RQ is not correct based also on additional condition(s). Specifically, one of the conditions for the relay device 30 to determine that the communication path of the request data RQ is not correct may be that the relay device 30 has received the request data RQ via the bus 50.

The relay device 30 may determine the communication path of the request data RQ regardless of whether the request data RQ has passed through the bus 50. Specifically, when the relay device 30 has received the request data RQ, the relay device 30 may determine that the communication path of the request data RQ is correct only on condition that the diagnostic tool 80 is connected to the port 31.

The relay device 30 may not repeatedly send the monitoring result MR. For example, the relay device 30 may send the monitoring result MR including the determination result JR of one determination only once. In the above embodiment, the relay device 30 determines for both the request data RQ and the response data RP out of the diagnostic data DD whether the communication path is correct. However, the relay device 30 may determine only for either the request data RQ or the response data RP whether the communication path is correct. Specifically, the relay device 30 may execute the request data determination program or the response data determination program in step S21. Therefore, the relay device 30 may not use the response data RP to determine whether the communication path of the diagnostic data DD is correct. Also, for example, the relay device 30 may not use the request data RQ to determine whether the communication path of the diagnostic data DD is correct.

Diagnosis Target Device

Only one of the control devices 40 may be a device to be diagnosed. The diagnosis target device 40A may change its communication state to the unlocked state without relying on the notification signal NS and only on condition that the prescribed time PT has elapsed since the communication state was changed to the locked state. Even in this case, any attempt for unauthorized access is blocked because the locked state is maintained for the prescribed time PT.

The diagnosis target device 40A may change its communication state to the unlocked state regardless of whether the prescribed time PT has elapsed and only on condition that the notification signal NS has been received. That is, the diagnosis target device 40A may change its communication state in response to the notification signal NS.

The diagnosis target device 40A may not change its communication state to the locked state when the diagnosis target device 40A has received the monitoring result MR including the determination result JR indicating that the communication path of the diagnostic data DD is not correct. For example, the diagnosis target device 40A may receive the diagnostic data DD, but may not perform control based on the received diagnostic data DD.

Related Technical Ideas

The following are technical ideas that can be grasped from the above embodiment and modifications.

APPENDIX I

A communication system comprising:
a relay device including a port configured to connect a diagnostic tool; and
a first diagnosis target device connected to the relay device via a first bus,
wherein the relay device is configured to
determine whether a communication path of diagnostic data for diagnosing the first diagnosis target device is correct when the relay deice has received the diagnostic data, the diagnostic data being data that is transferred between the relay device and the diagnostic tool, and
send to the first diagnosis target device a monitoring result including a determination result as to whether the communication path of the diagnostic data is correct.

APPENDIX II

The communication system according to Appendix I, wherein the relay device is configured to, when the relay device has received, as the diagnostic data, specific data via the first bus, determine that the communication path of the diagnostic data is not correct, the specific data being data that is sent from the diagnostic tool to the first diagnosis target device.

APPENDIX III

The communication system according to Appendix I or II, wherein the relay device is configured to, when the relay device has received specific data as the diagnostic data, determine that the communication path of the diagnostic data is correct on condition that the diagnostic tool is connected to the port, the specific data being data that is sent from the diagnostic tool to the first diagnosis target device.

APPENDIX IV

The communication system according to any one of Appendixes I to III, wherein:
the first diagnosis target device is configured to output response data to the diagnostic tool in response to specific data that is sent from the diagnostic tool to the first diagnosis target device; and
the relay device is configured to, when the relay device has received the response data as the diagnostic data, determine that the communication path of the diagnostic data is not correct on condition that the diagnostic tool is not connected to the port.

APPENDIX V

The communication system according to any one of Appendixes I to IV, wherein the relay device is configured to, when the relay device has determined that the communication path of the diagnostic data is not correct, repeatedly send the monitoring result including the determination result indicating that the communication path of the diagnostic data is not correct to the first diagnosis target device during a first predetermined time.

APPENDIX VI

The communication system according to any one of Appendixes I to V, wherein the first diagnosis target device is configured to change a communication state of the first diagnosis target device to a locked state on condition that the first diagnosis target device has received the monitoring result including the determination result indicating that the communication path of the diagnostic data is not correct, the locked state being a state in which at least communication of the diagnostic data is disabled.

APPENDIX VII

The communication system according to Appendix VI, wherein the first diagnosis target device is configured to change the communication state of the first diagnosis target device to an unlocked state on condition that a second predetermined time has elapsed since the communication state of the first diagnosis target device was changed to the locked state, the unlocked state being a state in which communication of the diagnostic data is enabled.

APPENDIX VIII

The communication system according to Appendix VII, wherein:
  the relay device is configured to, when the diagnostic tool is connected to the port, send to the first diagnosis target device a notification signal indicating that the diagnostic tool is connected to the port; and
  the first diagnosis target device is configured to, when the communication state of the first diagnosis target device is the locked state, change the communication state of the first diagnosis target device to the unlocked state on conditions that the first diagnosis target device has received the notification signal and that the second predetermined time has elapsed since the communication state of the first diagnosis target device was changed to the locked state.

APPENDIX IX

The communication system according to any one of Appendixes VI to VIII, wherein:
  the first diagnosis target device is connected to the relay device via a second bus in addition to via the first bus;
  the first diagnosis target device does not communicate data via the first bus when in the locked state; and
  the relay device sends the monitoring result to the first diagnosis target device via the second bus.

APPENDIX X

The communication system according to any one of Appendixes I to IX, further comprising a second diagnosis target device, wherein:

the second diagnosis target device is connected to the relay device via the first bus; and
the relay device is configured to send the monitoring result to the second diagnosis target device.

What is claimed is:
1. A communication system comprising:
  a relay device including a port configured to connect a diagnostic tool; and
  a first diagnosis target device connected to the relay device via a first bus,
  wherein the relay device is configured to
  determine whether a communication path of diagnostic data for diagnosing the first diagnosis target device is correct when the relay deice has received the diagnostic data, the diagnostic data being data that is transferred between the relay device and the diagnostic tool, and
  send to the first diagnosis target device a monitoring result including a determination result as to whether the communication path of the diagnostic data is correct.

2. The communication system according to claim 1, wherein the relay device is configured to, when the relay device has received, as the diagnostic data, specific data via the first bus, determine that the communication path of the diagnostic data is not correct, the specific data being data that is sent from the diagnostic tool to the first diagnosis target device.

3. The communication system according to claim 1, wherein the relay device is configured to, when the relay device has received specific data as the diagnostic data, determine that the communication path of the diagnostic data is correct on condition that the diagnostic tool is connected to the port, the specific data being data that is sent from the diagnostic tool to the first diagnosis target device.

4. The communication system according to claim 1, wherein:
  the first diagnosis target device is configured to output response data to the diagnostic tool in response to specific data that is sent from the diagnostic tool to the first diagnosis target device; and
  the relay device is configured to, when the relay device has received the response data as the diagnostic data, determine that the communication path of the diagnostic data is not correct on condition that the diagnostic tool is not connected to the port.

5. The communication system according to claim 1, wherein the relay device is configured to, when the relay device has determined that the communication path of the diagnostic data is not correct, repeatedly send the monitoring result including the determination result indicating that the communication path of the diagnostic data is not correct to the first diagnosis target device during a first predetermined time.

6. The communication system according to claim 1, wherein the first diagnosis target device is configured to change a communication state of the first diagnosis target device to a locked state on condition that the first diagnosis target device has received the monitoring result including the determination result indicating that the communication path of the diagnostic data is not correct, the locked state being a state in which at least communication of the diagnostic data is disabled.

7. The communication system according to claim 6, wherein the first diagnosis target device is configured to change the communication state of the first diagnosis target device to an unlocked state on condition that a second predetermined time has elapsed since the communication state of the first diagnosis target device was changed to the locked state, the unlocked state being a state in which communication of the diagnostic data is enabled.

8. The communication system according to claim 7, wherein:
the relay device is configured to, when the diagnostic tool is connected to the port, send to the first diagnosis target device a notification signal indicating that the diagnostic tool is connected to the port; and
the first diagnosis target device is configured to, when the communication state of the first diagnosis target device is the locked state, change the communication state of the first diagnosis target device to the unlocked state on conditions that the first diagnosis target device has received the notification signal and that the second predetermined time has elapsed since the communication state of the first diagnosis target device was changed to the locked state.

9. The communication system according to claim 6, wherein:
the first diagnosis target device is connected to the relay device via a second bus in addition to via the first bus;
the first diagnosis target device does not communicate data via the first bus when in the locked state; and
the relay device sends the monitoring result to the first diagnosis target device via the second bus.

10. The communication system according to claim 1, further comprising a second diagnosis target device, wherein:
the second diagnosis target device is connected to the relay device via the first bus; and
the relay device is configured to send the monitoring result to the second diagnosis target device.

* * * * *